United States Patent

Hashiguchi

(10) Patent No.: US 10,120,141 B2
(45) Date of Patent: Nov. 6, 2018

(54) OPTICAL MODULE

(71) Applicant: JAPAN AVIATION ELECTRONICS INDUSTRY, LIMITED, Tokyo (JP)

(72) Inventor: Osamu Hashiguchi, Tokyo (JP)

(73) Assignee: JAPAN AVIATION ELECTRONICS INDUSTRY, LIMITED, Tokyo (JP)

( * ) Notice: Subject to any disclaimer, the term of this patent is extended or adjusted under 35 U.S.C. 154(b) by 0 days.

(21) Appl. No.: 15/783,361

(22) Filed: Oct. 13, 2017

(65) Prior Publication Data

US 2018/0156989 A1    Jun. 7, 2018

(30) Foreign Application Priority Data

Jan. 12, 2016  (JP) .................................. 2016-233815

(51) Int. Cl.
  *G02B 6/42* (2006.01)

(52) U.S. Cl.
  CPC ........... *G02B 6/4202* (2013.01); *G02B 6/421* (2013.01); *G02B 6/4214* (2013.01); *G02B 6/4236* (2013.01); *G02B 6/4248* (2013.01); *G02B 6/4292* (2013.01); *G02B 6/423* (2013.01); *G02B 6/4204* (2013.01); *G02B 6/4249* (2013.01)

(58) Field of Classification Search
  CPC .............................. G02B 6/4202; G02B 6/421
  See application file for complete search history.

(56) References Cited

U.S. PATENT DOCUMENTS

| | | | |
|---|---|---|---|
| 7,108,432 B2 * | 9/2006 | Nagasaka | G02B 6/32 385/129 |
| 7,204,646 B2 * | 4/2007 | Sasaki | G02B 6/30 385/63 |
| 7,210,861 B2 * | 5/2007 | Nagasaka | G02B 6/4214 385/88 |
| 7,534,052 B2 * | 5/2009 | Fujiwara | G02B 6/4214 385/49 |
| 7,559,702 B2 * | 7/2009 | Fujiwara | G02B 6/4292 385/88 |

(Continued)

FOREIGN PATENT DOCUMENTS

JP    2013-140211    7/2013

OTHER PUBLICATIONS

U.S. Appl. No. 15/783,172 to Osamu Hashiguchi, filed Oct. 13, 2017.

*Primary Examiner* — Sung H Pak
(74) *Attorney, Agent, or Firm* — Greenblum & Bernstein, P.L.C.

(57) ABSTRACT

An optical module includes a first optical block (OB) which is mounted on a substrate and a second OB which holds an optical fiber. When orthogonal X and Z directions are parallel to a substrate surface and a direction orthogonal thereto is a Y direction, the first OB includes a base part and two extending parts which extend in the Z direction. The second OB is configured to be accommodated between the two extending parts from the upper side of the Y direction and to be moved in the Z direction between the two extending parts. Positioning parts for positioning the second OB with respect to the first OB in the X and Y directions are formed on the second OB. An extending direction of the optical fiber held by the second OB is the Z direction and a light traveling direction between the base part and the second OB is the Z direction.

12 Claims, 11 Drawing Sheets

(56) References Cited

U.S. PATENT DOCUMENTS

| | | | | |
|---|---|---|---|---|
| 8,475,054 B2* | 7/2013 | Shimotsu | ............ | G02B 6/3817 385/75 |
| 2001/0041034 A1* | 11/2001 | Sasaki | ............ | G02B 6/30 385/88 |
| 2002/0160656 A1* | 10/2002 | Nishita | ............ | G02B 6/3817 439/577 |
| 2004/0202477 A1* | 10/2004 | Nagasaka | ............ | G02B 6/4214 398/138 |

* cited by examiner

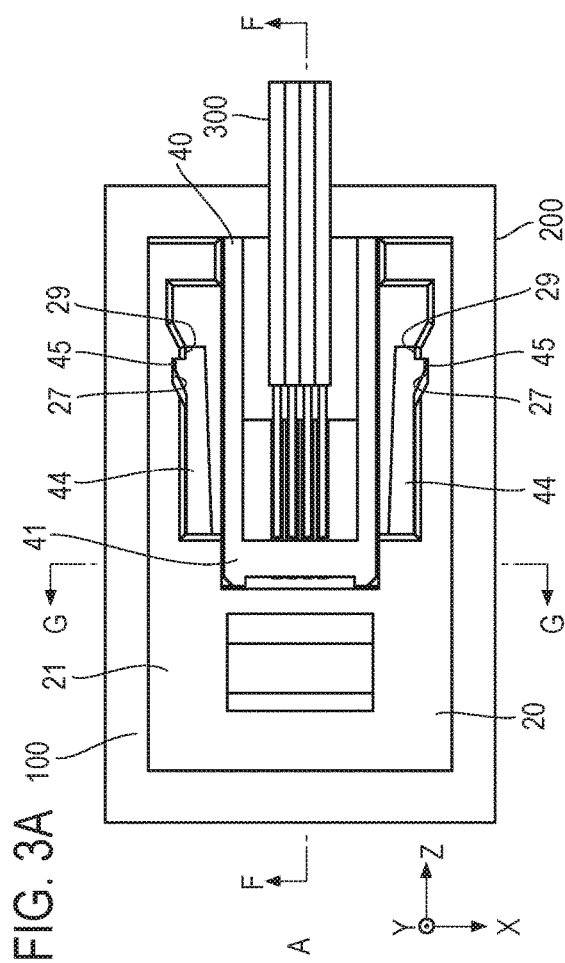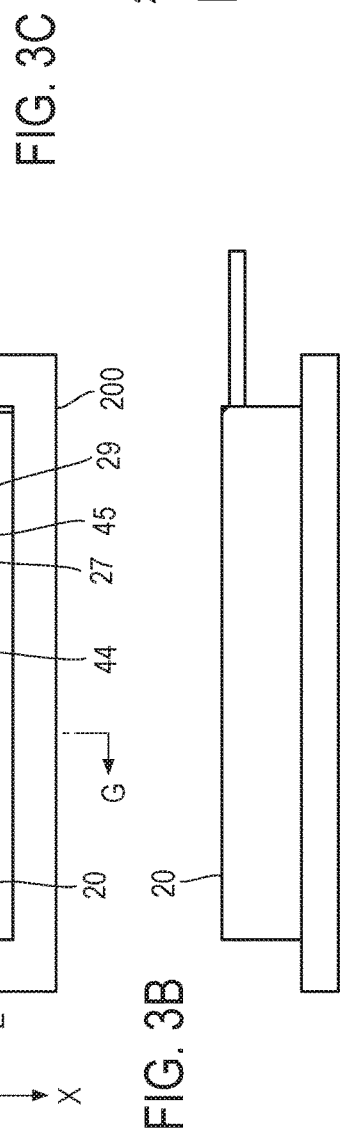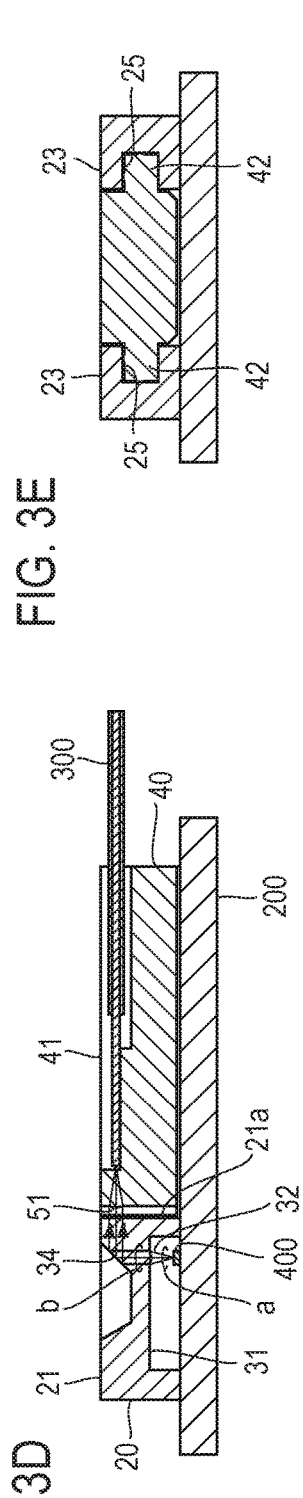
FIG. 3A
FIG. 3B
FIG. 3C
FIG. 3D
FIG. 3E

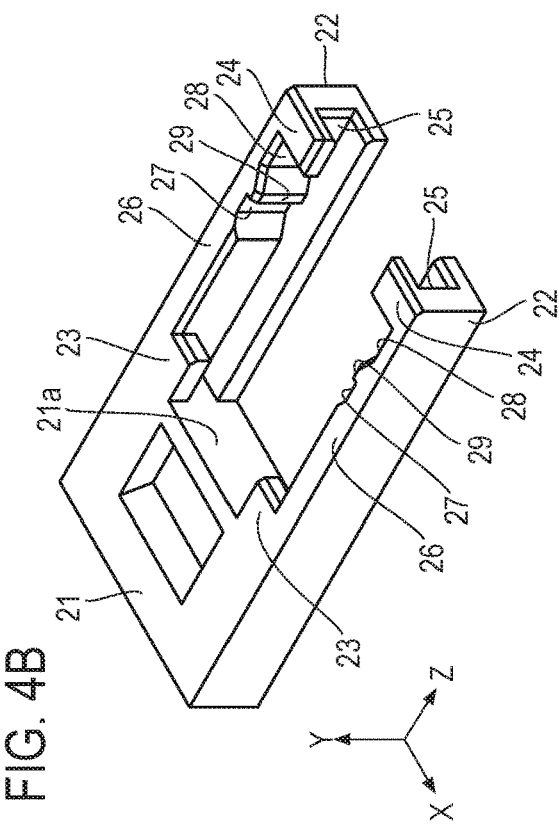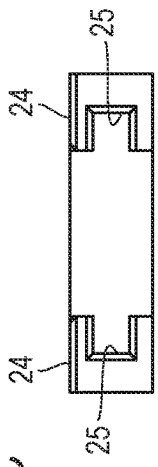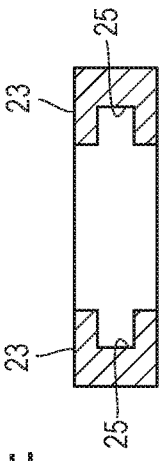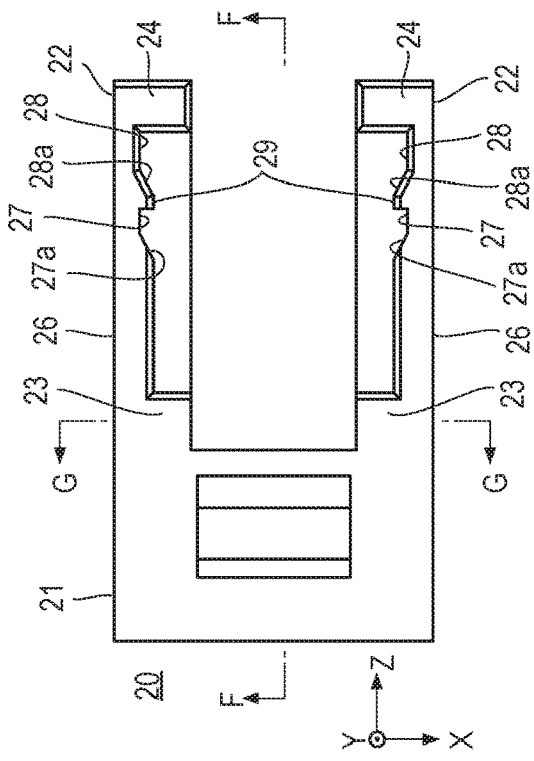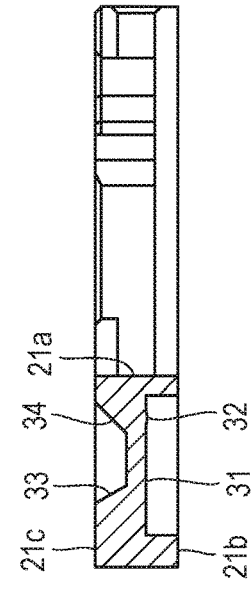

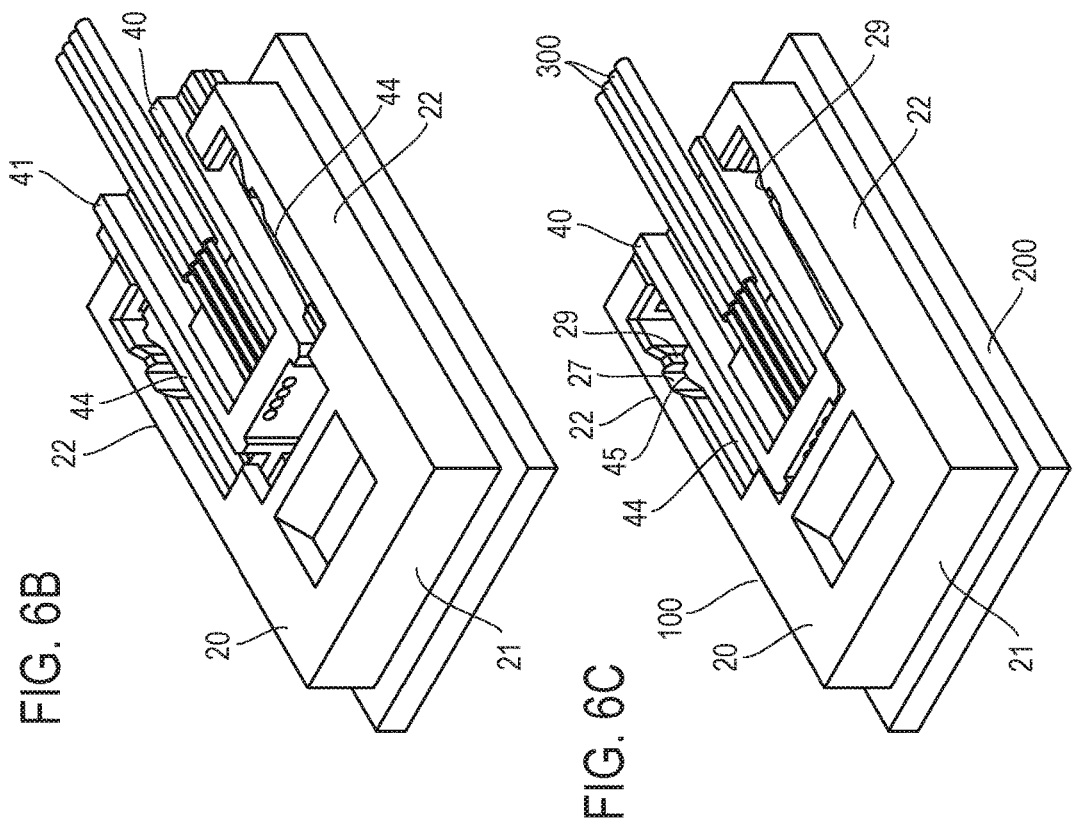
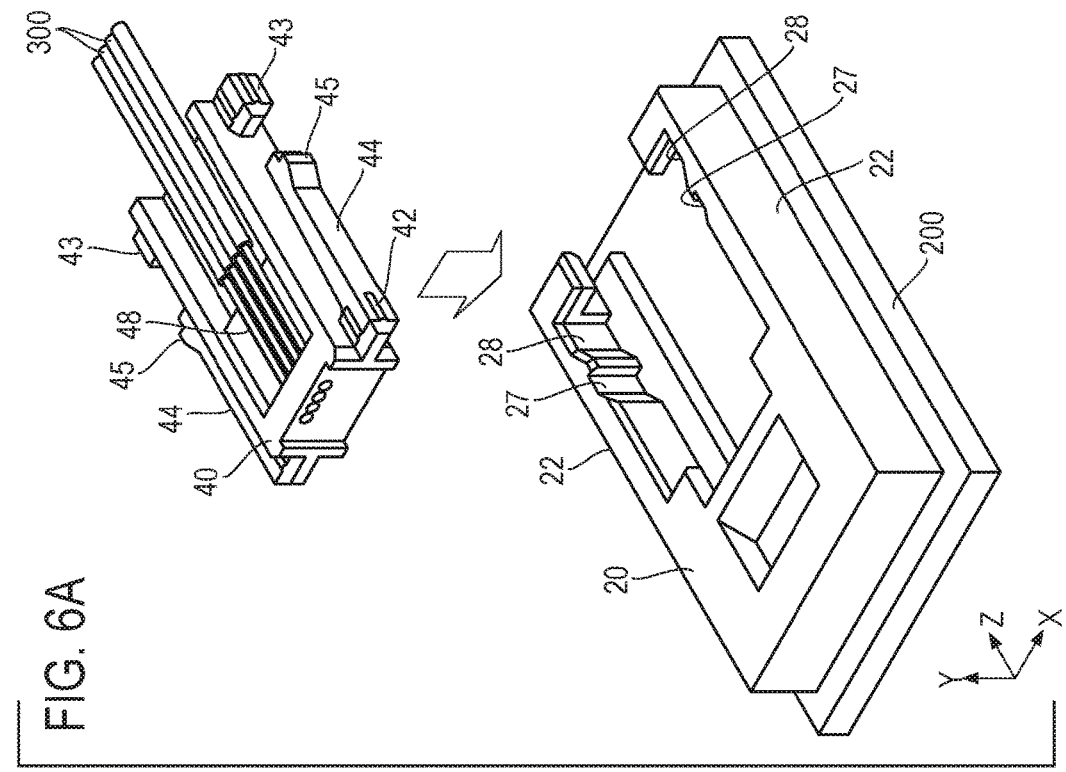

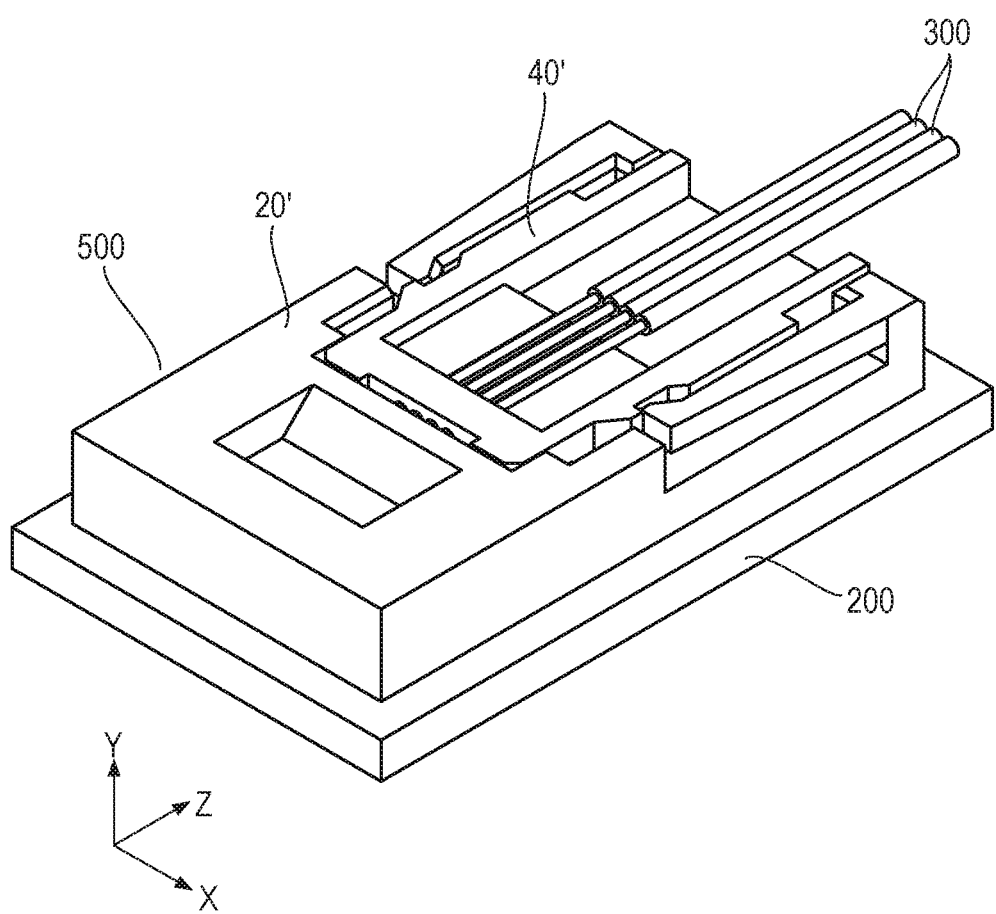

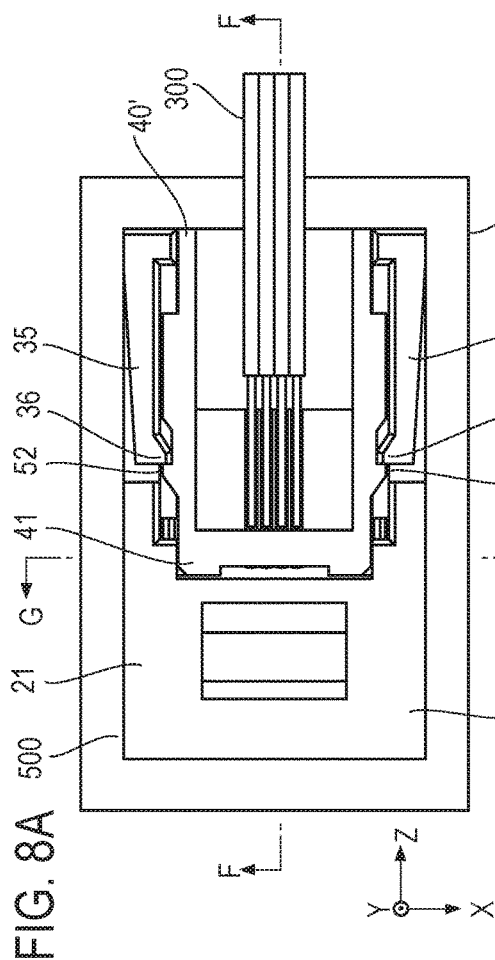

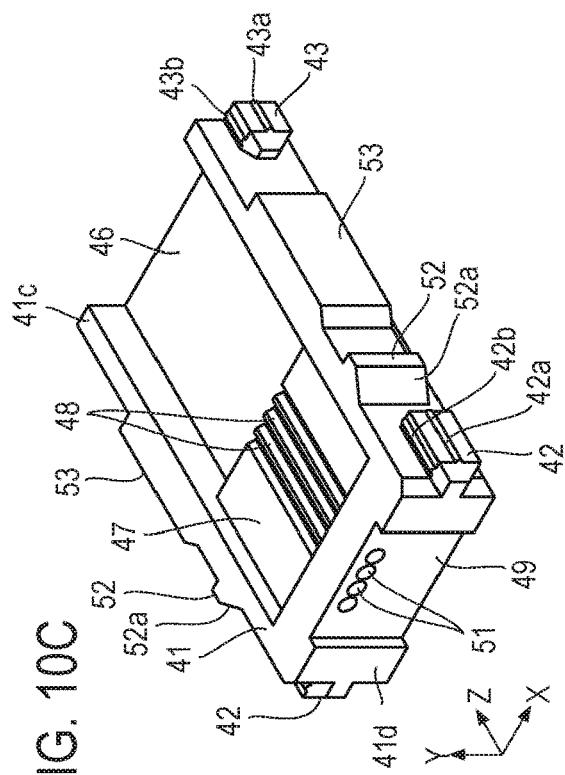
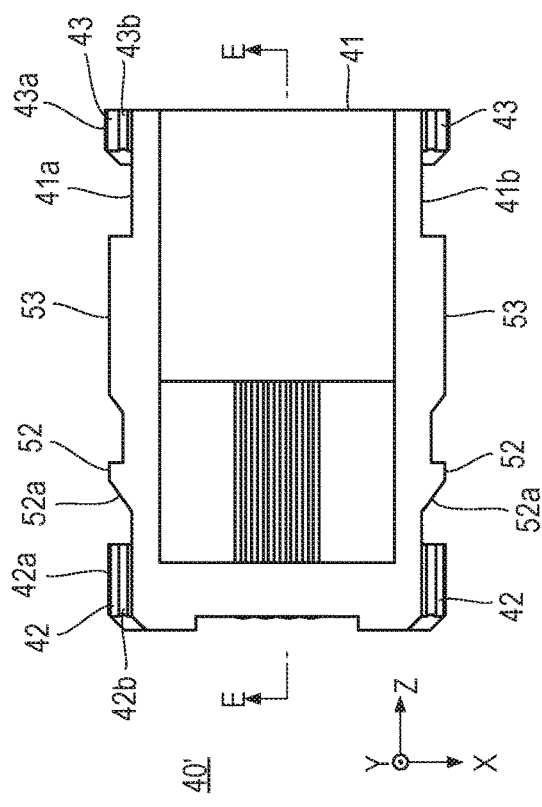
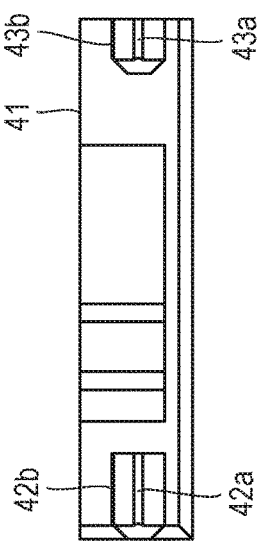

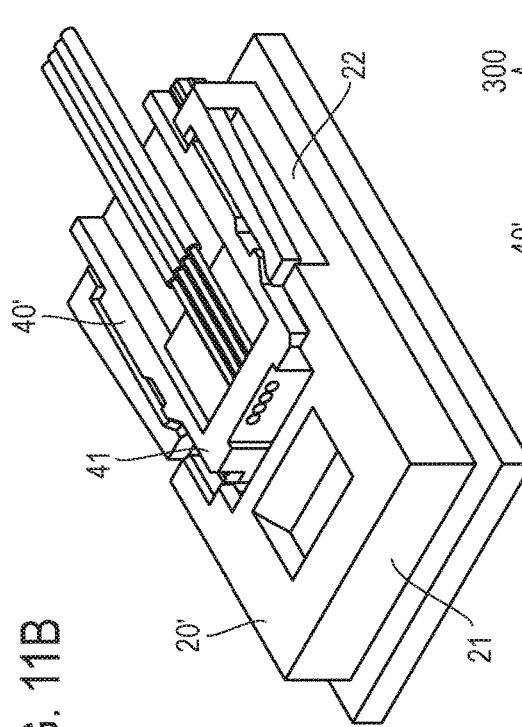
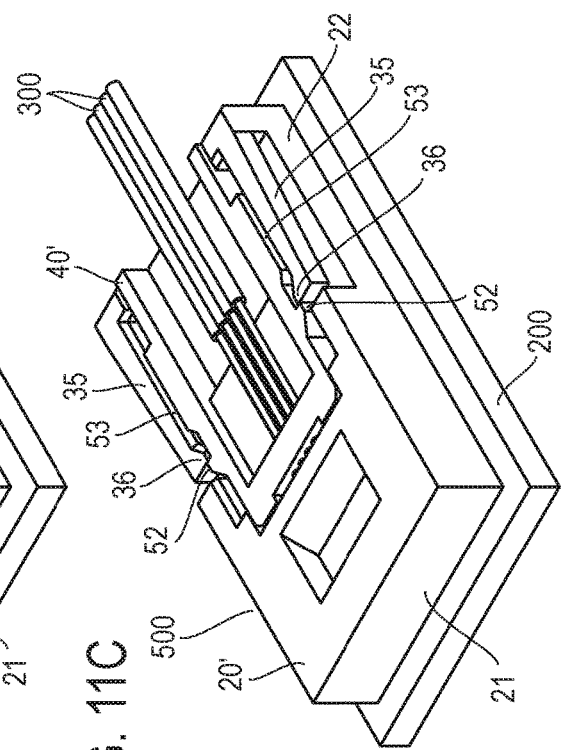
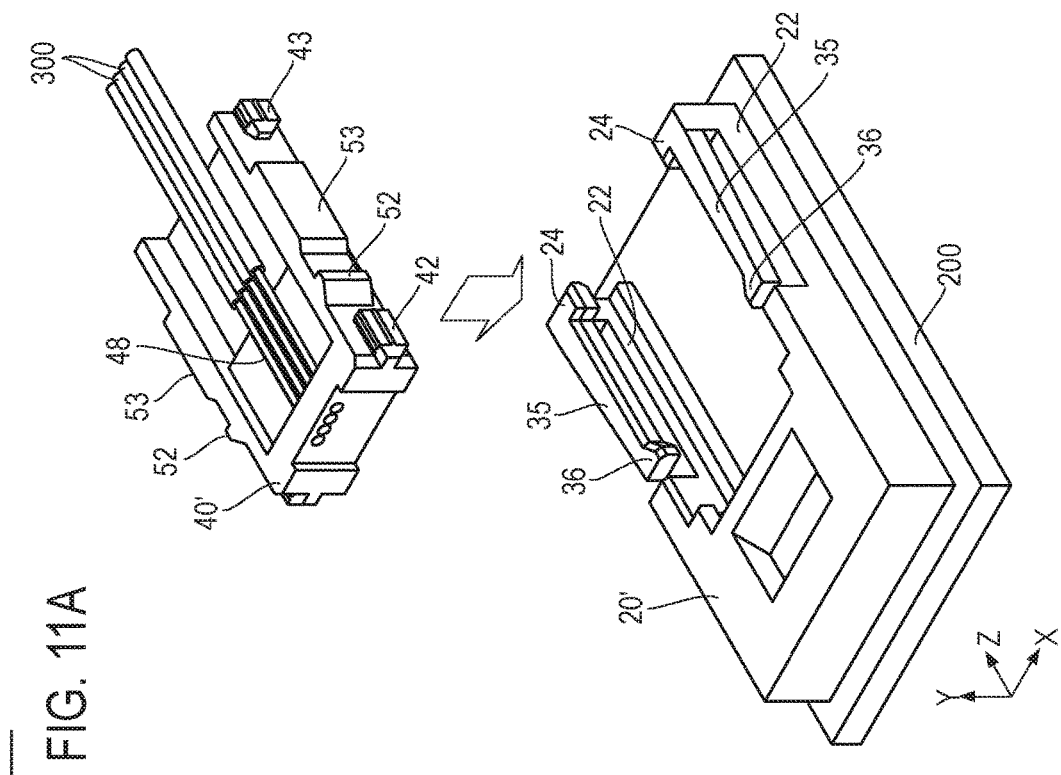
FIG. 11A
FIG. 11B
FIG. 11C

OPTICAL MODULE

TECHNICAL FIELD

The present invention relates to an optical module for optically connecting an optical fiber with an optical element such as a light emitting element and a light receiving element.

BACKGROUND ART

FIGS. 1A and 1B illustrate the configuration of an optical module described in Japanese Patent Application Laid Open No. 2013-140211 as a related art example of this type of optical module. The optical module includes a circuit substrate 12 on which one or more optical elements 11 are mounted, a housing 14 which accommodates the circuit substrate 12 therein, an optical fiber holding member 16 which holds one or more optical fibers 15 introduced from an optical cable 13 into the housing 14, and an optical coupling member 17 which optically connects the one or more optical elements 11 on the circuit substrate 12 and the one or more optical fibers 15. An end part of the optical cable 13 is fixed on the housing 14. The optical coupling member 17 is fixed on the circuit substrate 12. The optical coupling member 17 and the optical fiber holding member 16 are mutually coupled by fitting a guide pin 17a of the optical coupling member 17 into a guide hole 16a of the optical fiber holding member 16. The number of the optical fibers 15 is generally equal to the number of the optical elements 13, and the number of the optical elements 13 is usually greater than or equal to 2.

The optical coupling member 17 covers the optical element 11. Lens surfaces 17b are formed on a surface, which is opposed to the optical fiber holding member 16, of the optical coupling member 17. The number of the lens surfaces 17b is equal to the number of the optical elements 13. Lens surfaces (not shown) are formed on a surface, which is opposed to the optical element 11, of the optical coupling member 17. The number of these lens surfaces is equal to the number of the optical elements 13. A reflection surface 17c is formed on an upper surface of the optical coupling member 17.

In the case where the optical elements 11 are light emitting elements, for example, rays of light emitted from the light emitting elements pass through the lens surfaces to be incident on the optical coupling member 17. The rays of light reflected by the reflection surface 17c are optically coupled with end surfaces of the optical fibers 15 by the lens surfaces 17b.

Thus, the optical module illustrated in FIGS. 1A and 1B optically connects the optical elements 11 with the optical fibers 15. In this example, both of an optical connection direction and a mechanical connection direction between the optical fiber holding member 16 and the optical coupling member 17 are parallel to a plate surface of the circuit substrate 12.

As described above, since both of the optical connection direction and the mechanical connection direction between the optical fiber holding member 16 and the optical coupling member 17 are parallel to the plate surface of the circuit substrate 12 in the optical module of the related art illustrated in FIGS. 1A and 1B, a low-profile optical module can be configured. However, it is not easy to assemble the optical module. It is necessary to slide the optical fiber holding member 16 in an extending direction of the optical fibers 15 (that is, in a direction parallel to the plate surface of the circuit substrate 12) in assembling of the optical module illustrated in FIGS. 1A and 1B. Therefore, in the case where the optical fibers 15 are fixed at the end part of the optical cable 13, for example, the optical fibers 15 need to be bent and this bending may cause a damage of the optical fibers 15.

Further, the optical fiber holding member 16 and the optical coupling member 17 are mechanically connected to each other by inserting the guide pin 17a into the guide hole 16a. An insertion direction of the guide pin 17a is parallel to the plate surface of the circuit substrate 12. The optical fiber holding member 16 is positioned at one end side (that is, bonding end surface side) in the Z direction (that is, a direction parallel to the plate surface of the circuit substrate 12) by two guide pins 17a aligned in the X direction. Definitions of three orthogonal axes of X, Y, and Z are illustrated in FIGS. 1A and 1B. In the case where a force in the Y direction (a direction orthogonal to the plate surface of the circuit substrate 12), for example, is applied to the optical fibers 15 (or the optical cable 13), the optical fiber holding member 16 may rotate about the X axis and accordingly, optical coupling performance may be degraded.

By elongating each of the guide pin 17a and the guide hole 16a, for example, rotation about the X axis of the optical fiber holding member 16 can be suppressed. However, when the guide pin 17a is elongated, assembling becomes further difficult.

SUMMARY OF THE INVENTION

An object of the present invention is to provide an optical module which can be easily assembled and which is capable of suppressing rotation of an optical block holding an optical fiber even when a force is applied to the optical fiber.

An optical module according to the present invention is an optical module which optically connects an optical element with an optical fiber and includes a first optical block and a second optical block which is assembled with the first optical block. The first optical block is an optical block which is to be mounted on a substrate on which the optical element is mounted. The second optical block is an optical block configured to hold the optical fiber. The first optical block includes a base part and two extending parts. The two extending parts extend from the base part in a first direction which is orthogonal to an assembling direction. The assembling direction is a direction in which the second optical block is assembled with the first optical block. The second optical block is configured to be accommodated between the two extending parts and to be moved in the first direction between the two extending parts. Positioning parts are formed on the second optical block. The positioning parts perform positioning of the second optical block with respect to the first optical block in each of the assembling direction and a second direction. The second direction is orthogonal to the assembling direction and is orthogonal to the first direction. An extending direction of the optical fiber held by the second optical block is the first direction. A light traveling direction between the base part and the second optical block is the first direction.

Effects of the Invention

According to the present invention, since the second optical block holding the optical fiber is positioned in the second direction and the assembling direction, the second optical block is prevented from rotating about the second direction or the assembling direction even though a force is applied to the optical fiber.

Further, the optical module can be easily assembled by slightly moving the second optical block in the first direction after the second optical block is incorporated in the first optical block from the upper side in the assembling direction.

BRIEF DESCRIPTION OF THE DRAWINGS

FIG. 3A is a plan view of the optical module which is in the state illustrated in FIG. 2.

FIG. 3B is a front elevational view of the optical module which is in the state illustrated in FIG. 2.

FIG. 3C is a right lateral view of the optical module which is in the state illustrated in FIG. 2.

FIG. 3D is a sectional view taken along the line F-F of FIG. 3A.

FIG. 3E is a sectional view taken along the line G-G of FIG. 3A.

FIG. 4A is a plan view of a first optical block illustrated in FIG. 2.

FIG. 4B is a perspective view of the first optical block illustrated in FIG. 2.

FIG. 4C is a right lateral view of the first optical block illustrated in FIG. 2.

FIG. 4D is a sectional view taken along the line F-F of FIG. 4A.

FIG. 4E is a sectional view taken along the line G-G of FIG. 4A.

FIGS. 6A to 6C illustrate assembling of the optical module illustrated in FIG. 2.

FIG. 7 is a perspective view illustrating a state that an optical module according to a second embodiment of the present invention is mounted on a substrate.

FIG. 8A is a plan view of the optical module which is in the state illustrated in FIG. 7.

FIG. 8B is a front elevational view of the optical module which is in the state illustrated in FIG. 7.

FIG. 8C is a right lateral view of the optical module which is in the state illustrated in FIG. 7.

FIG. 8D is a sectional view taken along the line F-F of FIG. 8A.

FIG. 8E is a sectional view taken along the line G-G of FIG. 8A.

FIG. 10A is a plan view of a second optical block illustrated in FIG. 7.

FIG. 10B is a front elevational view of the second optical block illustrated in FIG. 7.

FIG. 10C is a perspective view of the second optical block illustrated in FIG. 7.

FIG. 10D is a sectional view taken along the line E-E of FIG. 10A.

FIGS. 11A to 11C illustrate assembling of the optical module illustrated in FIGS. 6A to 6C.

DETAILED DESCRIPTION OF THE EMBODIMENTS

Embodiments of the present invention will be described with reference to the accompanying drawings.

First Embodiment

Figure 1A:
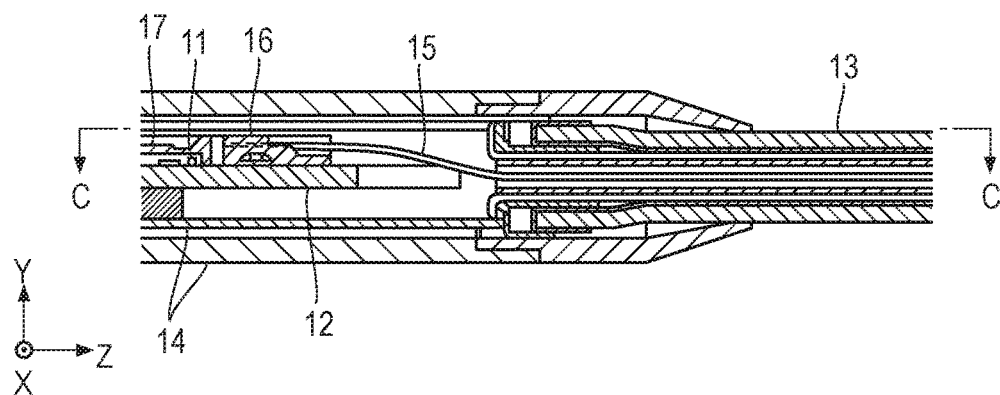
FIG. 1A is a sectional view illustrating a related art example of an optical module.
Figure 1B:
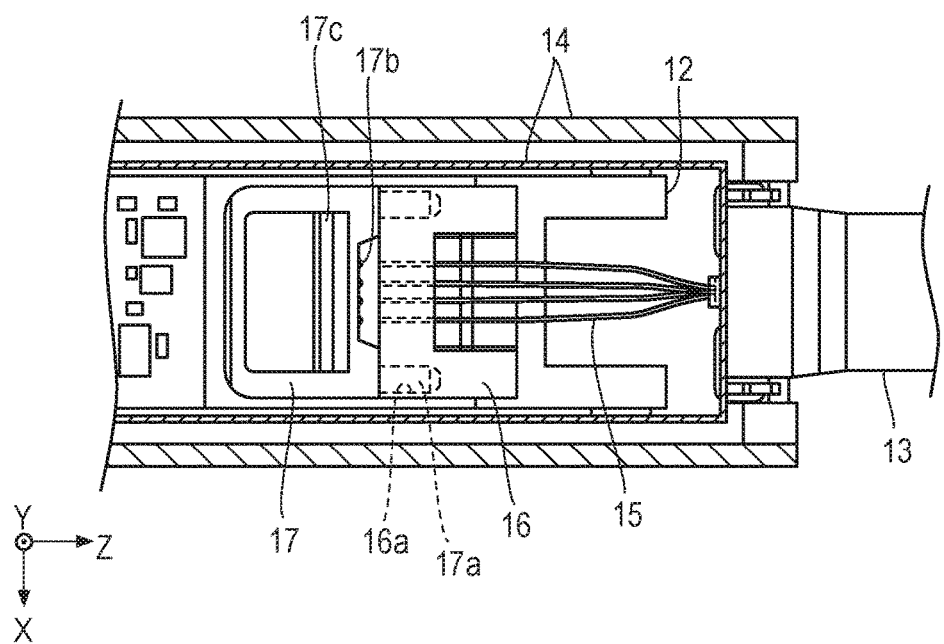
FIG. 1B is a sectional view, which is taken along the line C-C of FIG. 1A, of the optical module.
Figure 2:
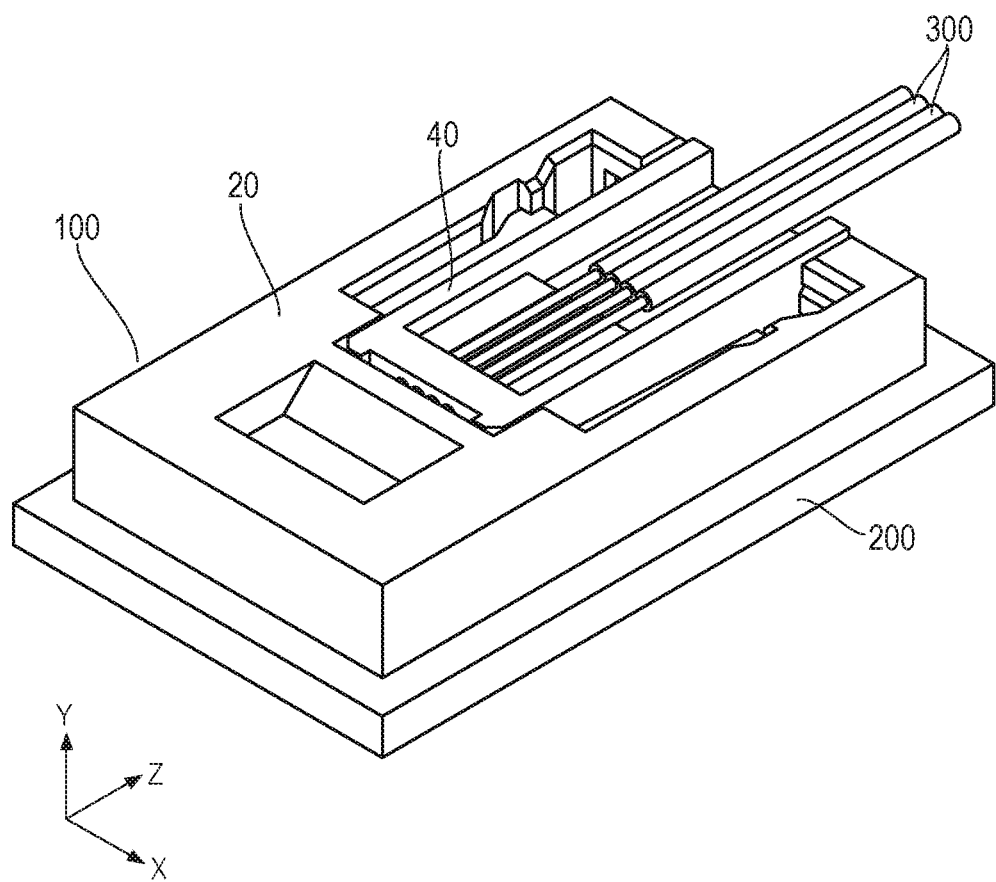
FIG. 2 is a perspective view illustrating a state that an optical module according to a first embodiment of the present invention is mounted on a substrate.
Figure 5A:
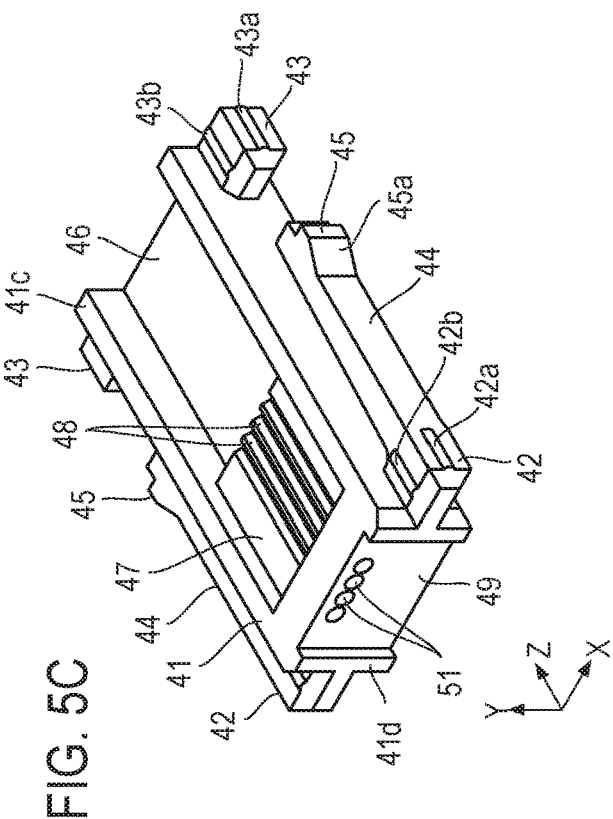
FIG. 5A is a plan view of a second optical block illustrated in FIG. 2.
Figure 5B:
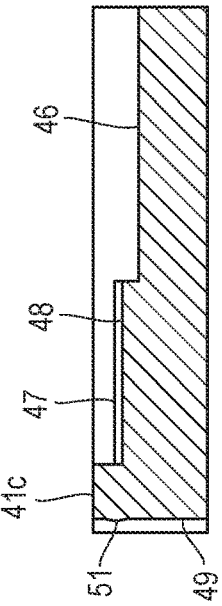
FIG. 5B is a front elevational view of the second optical block illustrated in FIG. 2.
Figure 5C:
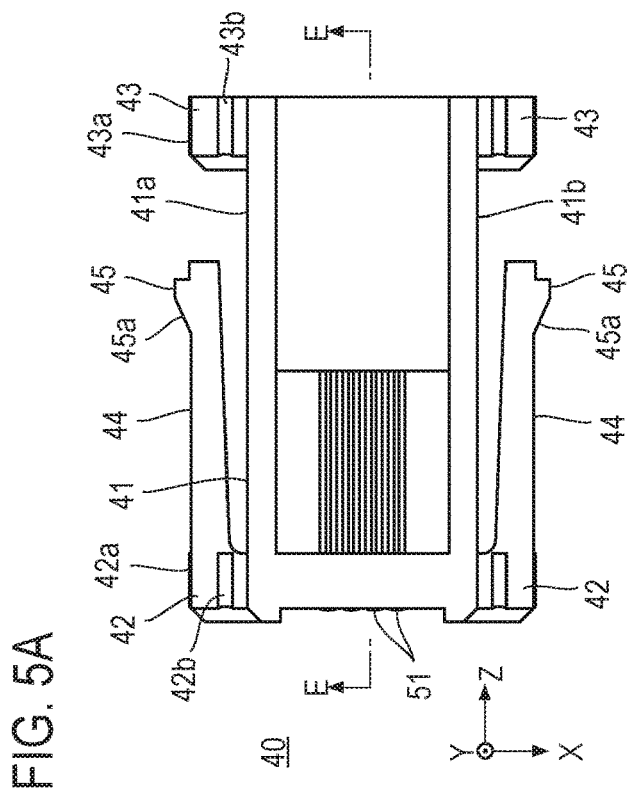
FIG. 5C is a perspective view of the second optical block illustrated in FIG. 2.
Figure 5D:
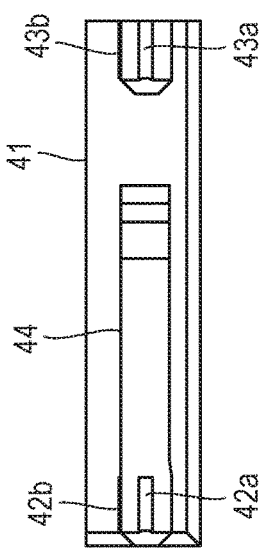
FIG. 5D is a sectional view taken along the line E-E of FIG. 5A.

FIG. 2 and FIGS. 3A to 3E illustrate a state that an optical module according to the first embodiment of the present invention is mounted on a substrate. An optical module 100 includes a first optical block 20 and a second optical block 40. FIGS. 4A to 4E illustrate the detailed configuration of the first optical block 20. FIGS. 5A to 5D illustrate the detailed configuration of the second optical block 40. The configurations of the first optical block 20 and the second optical block 40 will be first described with reference to FIGS. 4A to 4E and FIGS. 5A to 5D. In the following description, two orthogonal directions which are parallel to a plate surface of a substrate 200 and which are illustrated in FIG. 2 and FIGS. 3A to 3E are set as the X direction (the second direction) and the Z direction (the first direction), and a direction orthogonal to the plate surface of the substrate 200 is set as the Y direction (the assembling direction). The Z direction is an extending direction of optical fibers 300.

The first optical block 20 includes a base part 21 having a rectangular parallelepiped shape and two extending parts 22. The thickness, in the Y direction, of the base part 21 is equal to the thickness, in the Y direction, of the extending part 22. The two extending parts 22 extend from both end parts of a lateral surface 21a of the base part 21 to the Z direction. The lateral surface 21a is a surface parallel to the X-Y surface. The both end parts are both end parts, in the X direction, of the lateral surface 21a.

Regarding each of the extending parts 22, a section of each of a base end part 23 and a front end part 24 of the extending part 22 has a staple shape. Opening parts of the two extending parts 22 (that is, recessed parts of the sections having the staple shape) are opposed to each other. Thus, a groove 25 is formed on an inner lateral surface of each of the extending parts 22.

An intermediate part 26, which is positioned between the base end part 23 and the front end part 24, of each of the extending parts 22 has an L-shaped section which is open upward in the Y direction. A concave part 27 and a concave part 28 are formed on an inner lateral surface of each intermediate part 26. The concave part 27 formed on one intermediate part 26 is opposed to the concave part 27 formed on the other intermediate part 26. The concave part 28 formed on one intermediate part 26 is opposed to the concave part 28 formed on the other intermediate part 26. Regarding each concave part 27, an inner wall surface, which is closer to the base end part 23, of the concave part 27 is an inclined surface 27a and a section, in the X-Z surface, of the concave part 27 has a trapezoidal shape. Regarding each concave part 28, an inner wall surface, which is closer to the base end part 23, of the concave part 28 is an inclined surface 28a and a section, in the X-Z surface, of the concave part 28 has a trapezoidal shape. Regarding each extending part 22, the concave part 27 and concave part 28 are aligned in the Z direction near the front end part 24. In each extending part 22, a protrusion part 29 is formed between the concave part 27 and the concave part 28.

A space 31 for accommodating one or more elements is formed in the base part 21. The space 31 has an opening on a lower surface 21b of the base part 21. One or more lenses 32 for light collection are formed on a top surface of the space 31. The number of the one or more lenses 32 is four in this example. The four lenses 32 are aligned in the X direction on the position illustrated in FIG. 4D. A concave part 33 is formed on the base part 21. The concave part 33 has an opening on an upper surface 21c of the base part 21. A reflection surface 34 is formed on an inner surface part, which is positioned above the lenses 32, of the concave part 33.

The first optical block 20 having the above-described configuration is formed by resin molding with resin which transmits light.

As illustrated in FIGS. 5A to 5D, the second optical block 40 includes a holding part 41 having a rectangular parallelepiped shape, two protruding parts 42, two protruding parts 43, and two spring pieces 44. One protruding part 42 protrudes outward from one end part of one lateral surface 41a, which is parallel to the Y-Z surface, of the holding part 41. The other protruding part 42 protrudes outward from one end part of the other lateral surface 41b, which is parallel to the Y-Z surface, of the holding part 41. One protruding part 43 protrudes outward from the other end part of one lateral surface 41a. The other protruding part 43 protrudes outward from the other end part of the other lateral surface 41b. The two protruding parts 42 and the two protruding parts 43 function as positioning parts.

On an upper surface (a surface on the upper side between surfaces parallel to the X-Z surface) of each protruding part 42, a protrusion 42b having a rib shape extends in the Z direction. On a lateral surface (a surface parallel to the Y-Z surface) of each protruding part 42, a protrusion 42a having a rib shape extends in the Z direction. On an upper surface (a surface on the upper side between surfaces parallel to the X-Z surface) of each protruding part 43, a protrusion 43b having a rib shape extends in the Z direction. On a lateral surface (a surface parallel to the Y-Z surface) of each protruding part 43, a protrusion 43a having a rib shape extends in the Z direction.

Each of the two spring pieces 44 extends in the Z direction from a lateral surface, which faces the protruding part 43, of the protruding part 42 toward the protruding part 43. One end of the spring piece 44 is fixed on the protruding part 42 and the other end of the spring piece 44 (an end part closer to the protruding part 43) is a free end. A lance 45 is formed on an outer lateral surface of the end of each spring piece 44. A lateral surface, which faces the protruding part 42, of the lance 45 is an inclined surface 45a. An inner lateral surface of one spring piece 44 is separate from the lateral surface 41a of the holding part 41 by a predetermined distance and an inner lateral surface of the other spring piece 44 is separate from the lateral surface 41b of the holding part 41 by a predetermined distance.

A concave part 46 is formed on the holding part 41. A bottom surface of the concave part 46 is lower than an upper surface 41c of the holding part 41. The concave part 46 extends, from an end on the side on which the protruding parts 43 are positioned in the Z direction, to the vicinity of an end on the side on which the protruding parts 42 are positioned. A step part 47 is formed on an inner end side of the concave part 46. An upper surface of the step part 47 is a little higher than the bottom surface of the concave part 46 other than the step part 47. Four V grooves 48 are formed on the step part 47, in this example. Each of the V grooves 48 extends in the Z direction.

A concave part 49 is formed on an end surface 41d (an end surface on the side on which the protruding parts 42 are positioned) of the holding part 41. The concave part 49 extends from a lower end, in the Y direction, of the end surface 41d to an upper end, in the Y direction, of the end surface 41d. Four lenses 51 are formed on a bottom surface of the concave part 49. The four lenses 51 are positioned on extension lines of the four V grooves 48.

The second optical block 40 having the above-described configuration is formed by resin molding with resin which transmits light.

Subsequently, assembling of the optical module 100 including the first optical block 20 and the second optical block 40 and mounting of the optical module 100 onto the substrate 200 will be described with reference to FIGS. 6A to 6C.

As illustrated in FIG. 6A, the optical fibers 300 are positioned by the four V grooves 48 of the second optical block 40. The first optical block 20 is fixed on the substrate 200, on which optical elements 400 is mounted (see FIG. 3D), with an adhesive. The second optical block 40 which holds the optical fibers 300 is incorporated between the two extending parts 22 of the first optical block 20 from an upper side in the Y direction. At this time, the front end part 24 passes between the free end of the spring piece 44 and the protruding part 43. The lance 45 of the spring piece 44 is accommodated in the concave part 28 of the extending part 22. FIG. 6B illustrates a state that the second optical block 40 is incorporated in the first optical block 20.

In the state illustrated in FIG. 6B, when the second optical block 40 is pushed toward the base part 21 of the first optical block 20, the second optical block 40 is moved in the Z direction (see FIG. 2, FIGS. 3A to 3E, and FIG. 6C).

In this movement, the lances 45 are pushed by the protrusion parts 29 of the extending parts 22. Accordingly, the two spring pieces 44 are bent toward the holding part 41. When the lances 45 get over the protrusion parts 29, the two spring pieces 44 return to the original state by elasticity thereof. The lances 45 enter the concave parts 27 as illustrated in FIG. 6C. Movement of the second optical block 40 in the Z direction is prevented in this state because the lances 45 abut on the protrusion parts 29.

The two protruding parts 42 of the second optical block 40 are inserted into the grooves 25 of the base end parts 23 of the two extending parts 22 as illustrated in FIG. 3E. The two protruding parts 43 of the second optical block 40 are inserted into the grooves 25 of the front end parts 24 of the two extending parts 22 as illustrated in FIG. 3C. At this time, each of the protrusions 42a, 42b, 43a, and 43b having a rib shape is pressed against the inner wall surface of the groove 25. That is, the protruding parts 42 and 43 are firmly fixed on the grooves 25 in the X direction and the Y direction. Thus, the holding part 41 of the second optical block 40 is positioned in the X direction and the Y direction.

The second optical block 40 is positioned with respect to the first optical block 20 as described above. Thus, the base part 21 of the first optical block 20 and the holding part 41 of the second optical block 40 are assembled with high accuracy.

As illustrated in FIG. 3D, in the state that the first optical block 20 is fixed on the substrate 200, the lenses 32 are positioned just above the optical elements 400. An optical axis of each of the optical elements 400 is accorded with the optical axis of the corresponding one of the lenses 32. The optical elements 400 are accommodated in the space 31 formed in the first optical block 20.

The optical element 400 is a light emitting element such as a vertical cavity surface emitting laser (VCSEL) or a light receiving element such as a photo diode (PD), for example. In this example, the optical elements 400 are optically connected to the optical fibers 300 with high coupling efficiency (that is, with low loss).

Arrows in FIG. 3D represent travel of light in the case where the optical element 400 is a VCSEL. Emission light "a" emitted from the optical element 400 is converted into parallel light "b" by the lens 32. The traveling direction of the parallel light "b" is bent by 90° by the reflection surface 34 having an inclination of 45° with respect to the plate surface of the substrate 200. Then, the parallel light "b" is given out from the lateral surface 21a of the base part 21. The parallel light given out from the lateral surface 21a travels through a space to reach the lens 51 of the holding part 41. The parallel light is collected by the lens 51 to be incident on the end surface of the optical fiber 300. Thus, the optical elements 400 and the optical fibers 300 are optically connected to each other via the lenses 32 and 51 and the reflection surface 34, in this example. The extending direction of the optical fibers 300 which are held by the second optical block 40 is the Z direction which is parallel to the plate surface of the substrate 200. Further, a light traveling direction between the base part 21 of the first optical block 20 and the holding part 41 of the second optical block 40 is also the Z direction which is parallel to the plate surface of the substrate 200.

In the above-described configuration, movement, in the Z direction, of the second optical block 40 is prevented after positioning in the X direction and the Y direction. However, each of the base part 21 of the first optical block 20 and the holding part 41 of the second optical block 40 is not strictly positioned in the Z direction. Since the traveling direction of light in between the base part 21 and the holding part 41 is parallel to the plate surface of the substrate 200, the base part 21 and the holding part 41 do not have to be highly accurately positioned in the Z direction.

The optical module according to the first embodiment of the present invention provides the following advantageous effects.

1) The second optical block 40 holding the optical fibers 300 is positioned in each of the X direction and the Y direction on four places which are mutually separate in the Z direction and the X direction (that is, four corners of the second optical block 40). Therefore, even though a force in the Y direction is applied to the optical fibers 300, the second optical block 40 does not rotate about the X axis. Further, even though a force in the X direction is applied to the optical fibers 300, the second optical block 40 does not rotate about the Y axis. Accordingly, degradation in the optical coupling performance caused by rotation is prevented.

2) Only by pushing the second optical block 40 in between the two extending parts 22 of the first optical block 20, the second optical block 40 can be incorporated between the two extending parts 22. Further, only by slightly moving the second optical block 40 in the Z direction (a direction parallel to the plate surface of the substrate 200), positioning of the second optical block 40 is completed. Thus, assembling of the optical module 100 is easy.

3) The optical connection direction between the first optical block and the second optical block 40 is parallel to the plate surface of the substrate 200. That is, the first optical block 20 and the second optical block are not overlapped with each other directly above the optical element 400. Accordingly, the optical module 100 can be configured to be low-profile.

Second Embodiment

Figure 9A:
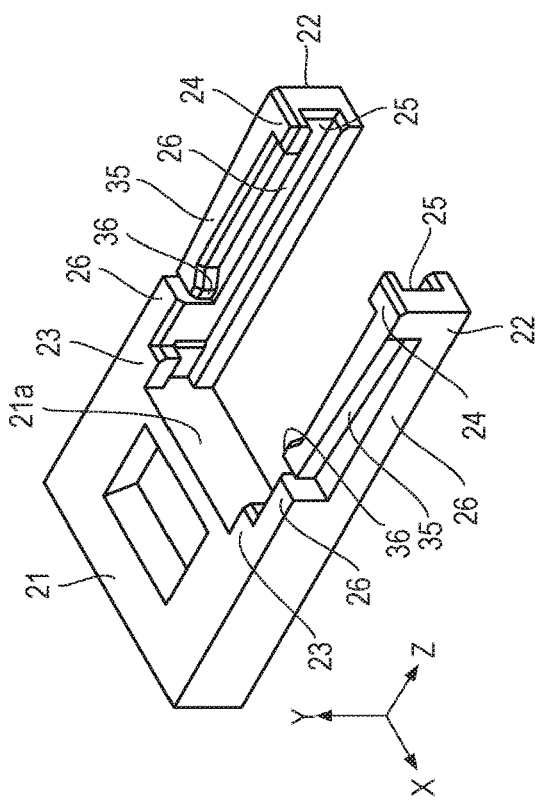
FIG. 9A is a plan view of a first optical block illustrated in FIG. 7.
Figure 9B:
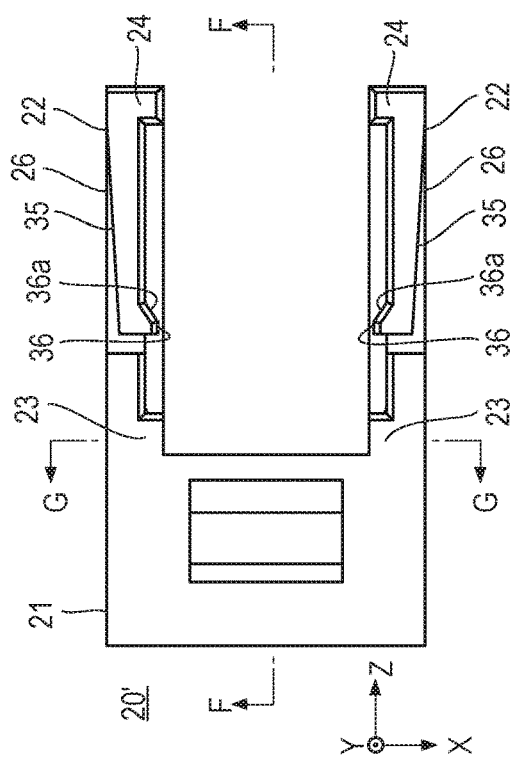
FIG. 9B is a perspective view of the first optical block illustrated in FIG. 7.
Figure 9C:
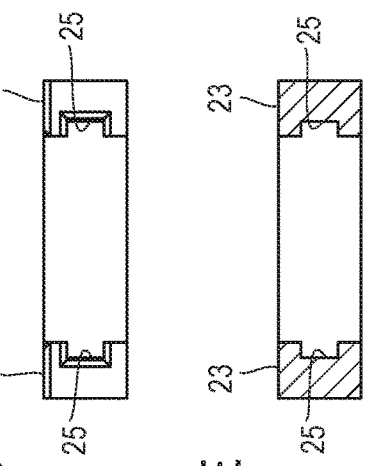
FIG. 9C is a right lateral view of the first optical block illustrated in FIG. 7.
Figure 9D:
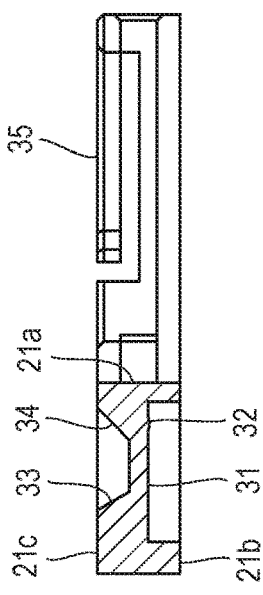
FIG. 9D is a sectional view taken along the line F-F of FIG. 9A.
Figure 9E:
FIG. 9E is a sectional view taken along the line G-G of FIG. 9A.

FIG. 7 and FIGS. 8A to 8E illustrate a state that an optical module according to the second embodiment of the present invention is mounted on a substrate. An optical module 500 includes a first optical block 20' and a second optical block 40'. FIGS. 9A to 9E illustrate the detailed configuration of the first optical block 20'. FIGS. 10A to 10D illustrate the detailed configuration of the second optical block 40'. The configurations of the first optical block 20' and the second optical block 40' will be described with reference to FIGS. 9A to 9E and FIGS. 10A to 10D. Duplicate description is omitted by providing identical reference characters to components corresponding to those of the first embodiment.

The first optical block 20' has the configuration illustrated in FIGS. 9A to 9E. The first optical block 20' is different from the first optical block of the first embodiment in the following points. The concave parts 27 and 28 and the protrusion parts 29 are not provided to the two extending parts 22 but spring pieces 35 are formed on the extending parts 22.

The spring piece 35 extends in the Z direction from the front end part 24 to the base end part 23 of the extending part 22. One end of the spring piece 35 is fixed on the front end part 24 and the other end (an end part closer to the base end part 23) of the spring piece 35 is a free end. A part of the intermediate part 26 of the extending part 22 has the thickness which is approximately half of the thickness, in the Y direction, of the base part 21. A lower surface of this part is included in a plane including the lower surface 21b of the base part 21. That is, a position of an upper surface of this part is lower than the position of the upper surface 21c of the base part 21. The spring piece 35 is positioned directly above a part of the intermediate part 26. An upper surface of the spring piece 35 is included in a plane including the upper surface 21c of the base part 21. There is a void between a part of the intermediate part 26 and the spring piece 35. A lance 36 protrudes from an inner lateral surface of an end of the spring piece 35. A lateral surface of the lance 36 facing the front end part 24 is an inclined surface 36a.

The second optical block 40' has the configuration illustrated in FIGS. 10A to 10D. The second optical block 40' is different from the second optical block 40 of the first embodiment in the following points. The two spring pieces 44 are not provided, the width, in the X direction, of the holding part 41 is a little larger than that of the first embodiment, and one protruding part 42, one protruding part 43, one protrusion part 52, and one protrusion part 53 are formed on each of both lateral surfaces 41a and 41b of the holding part 41.

The protrusion part 52 is positioned in the vicinity of the protruding part 42. A lateral surface, which faces the protruding part 42, of the protrusion part 52 is an inclined surface 52a. The protrusion part 53 is positioned between the protrusion part 52 and the protruding part 43.

In the first embodiment, a retaining mechanism for the second optical block 40 is composed of the lances 45 formed on the spring pieces 44 of the second optical block 40 and the protrusion parts 29 formed on the first optical block 20. On the other hand, in the second embodiment, a retaining mechanism for the second optical block 40' is composed of the lances 36 formed on the spring pieces 35 of the first optical block 20' and the protrusion parts 52 formed on the second optical block 40'.

The first optical block 20' and the second optical block 40' having the above-described configurations are formed by resin molding with resin which transmits light.

Subsequently, assembling of the optical module 500 including the first optical block 20' and the second optical block 40' and mounting of the optical module 500 onto the substrate 200 will be described with reference to FIGS. 11A to 11C.

As illustrated in FIG. 11A, the optical fibers 300 are positioned by the four V grooves 48 of the second optical block 40'. The first optical block 20' is fixed on the substrate 200, on which the optical elements 400 are mounted (see FIG. 8D), with an adhesive. The second optical block 40' which holds the optical fibers 300 is incorporated between the two extending parts 22 of the first optical block 20' from the upper side in the Y direction. At this time, the front end part 24 passes between the protrusion part 53 and the protruding part 43. The lance 36 of the spring piece 35 is accommodated between the protruding part 42 and the protrusion part 52. FIG. 11B illustrates a state that the second optical block 40' is incorporated in the first optical block 20'.

In the state illustrated in FIG. 11B, when the second optical block 40' is pushed toward the base part 21 of the first optical block 20', the second optical block 40' is moved in the Z direction (see FIG. 7, FIGS. 8A to 8E, and FIG. 11C).

In this movement, the lances 36 are pushed by the protrusion parts 52. Accordingly, the two spring pieces 35 are bent in a direction away from the holding part 41. When the lances 36 get over the protrusion parts 52, the two spring pieces 35 return to the original state by elasticity thereof. The lance 36 enters between the protrusion part 52 and the protrusion part 53 of the second optical block 40' as illustrated in FIG. 11C. Movement of the second optical block 40' in the Z direction is prevented in this state because the lances 36 abut on the protrusion parts 52.

The two protruding parts 42 of the second optical block 40' are inserted into the grooves 25 of the base end parts 23 of the two extending parts 22 as illustrated in FIG. 8E. The two protruding parts 43 of the second optical block 40' are inserted into the grooves 25 of the front end parts 24 of the two extending parts 22 as illustrated in FIG. 8C. At this time, each of the protrusions 42a, 42b, 43a, and 43b having a rib shape is pressed against the inner wall surface of the groove 25. That is, the protruding parts 42 and 43 are firmly fixed on the grooves 25 in the X direction and the Y direction. Thus, the holding part 41 of the second optical block 40' is positioned in the X direction and the Y direction.

The second optical block 40' is positioned with respect to the first optical block 20' as described above. Thus, the base part 21 of the first optical block 20' and the holding part 41 of the second optical block 40' are assembled with high accuracy. The optical element 400 and the optical fibers 300 are optically connected to each other via the lenses 32 and 51 and the reflection surface 34 with high coupling efficiency. The extending direction of the optical fibers 300 which are held by the second optical block 40' is the Z direction which is parallel to the plate surface of the substrate 200. Further, a light traveling direction between the base part 21 of the first optical block 20' and the holding part 41 of the second optical block 40' is also the Z direction which is parallel to the plate surface of the substrate 200.

In the second embodiment as well, the base part 21 of the first optical block 20' and the holding part 41 of the second optical block 40' are not strictly positioned in the Z direction. However, there are no problems as described in the first embodiment.

Advantageous effects same as the advantageous effects 1) to 3) described in the first embodiment are obtained in the second embodiment as well.

The foregoing description of the embodiments of the invention has been presented for the purpose of illustration and description. It is not intended to be exhaustive and to limit the invention to the precise form disclosed. Modifications or variations are possible in light of the above teaching. The embodiments were chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. An optical module which optically connects an optical element with an optical fiber, the optical module comprising:
   a first optical block; and
   a second optical block which is assembled with the first optical block, wherein
   the first optical block is an optical block which is to be mounted on a substrate on which the optical element is mounted,
   the second optical block is an optical block configured to hold the optical fiber,
   the first optical block includes
      a base part, and
      two extending parts which extend from the base part in a first direction which is orthogonal to an assembling direction, the assembling direction being a direction in which the second optical block is assembled with the first optical block,
   the second optical block is configured to be accommodated between the two extending parts and to be moved in the first direction between the two extending parts,
   positioning parts are formed on the second optical block, the positioning parts being for positioning the second optical block with respect to the first optical block in each of the assembling direction and a second direction, and the second direction being orthogonal to the assembling direction and being orthogonal to the first direction,
   an extending direction of the optical fiber held by the second optical block is the first direction, and
   a light traveling direction between the base part and the second optical block is the first direction.

2. The optical module according to claim 1, wherein
   the positioning parts are four protruding parts which protrude outward in the second direction,
   a first groove is formed on an inner lateral surface of each of a base end part and a front end part of one of the two extending parts, a second groove is formed on an inner lateral surface of each of a base end part and a front end part of the other of the two extending parts, each of the two protruding parts among the four protruding parts is accommodated in the first groove by moving the second optical block, and each of the other two protruding parts among the four protruding parts is accommodated in the second groove by moving the second optical block.

3. The optical module according to claim 1, further comprising:

a retaining mechanism which prevents movement of the second optical block in the first direction after positioning of the second optical block with respect to the first optical block, wherein the retaining mechanism includes a spring piece having a lance formed on an end thereof and a protrusion part which is hooked on the lance, the spring piece is formed on each of the two extending parts, and the protrusion part is formed on the second optical block.

4. The optical module according to claim 2, further comprising:

a retaining mechanism which prevents movement of the second optical block in the first direction after positioning of the second optical block with respect to the first optical block, wherein the retaining mechanism includes a spring piece having a lance formed on an end thereof and a protrusion part which is hooked on the lance, the spring piece is formed on each of the two extending parts, and the protrusion part is formed on the second optical block.

5. The optical module according to claim 1, further comprising:

a retaining mechanism which prevents movement of the second optical block in the first direction after positioning of the second optical block with respect to the first optical block, wherein the retaining mechanism includes a spring piece having a lance formed on an end thereof and a protrusion part which is hooked on the lance, the spring piece is formed on the second optical block, and the protrusion part is formed on each of the two extending parts.

6. The optical module according to claim 2, further comprising:

a retaining mechanism which prevents movement of the second optical block in the first direction after positioning of the second optical block with respect to the first optical block, wherein the retaining mechanism includes a spring piece having a lance formed on an end thereof and a protrusion part which is hooked on the lance, the spring piece is formed on the second optical block, and the protrusion part is formed on each of the two extending parts.

7. The optical module according to claim 1, wherein a space which accommodates the optical element is formed on a surface of the base part, the surface facing the substrate in mounting of the first optical block onto the substrate, a reflection surface which reflects light is formed on the base part, and the reflection surface has an inclination of 45° with respect to the assembling direction.

8. The optical module according to claim 2, wherein a space which accommodates the optical element is formed on a surface of the base part, the surface facing the substrate in mounting of the first optical block onto the substrate, a reflection surface which reflects light is formed on the base part, and the reflection surface has an inclination of 45° with respect to the assembling direction.

9. The optical module according to claim 3, wherein a space which accommodates the optical element is formed on a surface of the base part, the surface facing the substrate in mounting of the first optical block onto the substrate, a reflection surface which reflects light is formed on the base part, and the reflection surface has an inclination of 45° with respect to the assembling direction.

10. The optical module according to claim 4, wherein a space which accommodates the optical element is formed on a surface of the base part, the surface facing the substrate in mounting of the first optical block onto the substrate, a reflection surface which reflects light is formed on the base part, and the reflection surface has an inclination of 45° with respect to the assembling direction.

11. The optical module according to claim 5, wherein a space which accommodates the optical element is formed on a surface of the base part, the surface facing the substrate in mounting of the first optical block onto the substrate, a reflection surface which reflects light is formed on the base part, and the reflection surface has an inclination of 45° with respect to the assembling direction.

12. The optical module according to claim 6, wherein a space which accommodates the optical element is formed on a surface of the base part, the surface facing the substrate in mounting of the first optical block onto the substrate, a reflection surface which reflects light is formed on the base part, and the reflection surface has an inclination of 45° with respect to the assembling direction.

* * * * *

UNITED STATES PATENT AND TRADEMARK OFFICE
CERTIFICATE OF CORRECTION

PATENT NO. : 10,120,141 B2  
APPLICATION NO. : 15/783361  
DATED : November 6, 2018  
INVENTOR(S) : O. Hashiguchi Page 1 of 1

It is certified that error appears in the above-identified patent and that said Letters Patent is hereby corrected as shown below:

On the Title Page

Item (30) Foreign Application Priority Data, please correct the priority date to read:
-- Dec. 1, 2016 --.

Signed and Sealed this
Twenty-sixth Day of February, 2019

Andrei Iancu
*Director of the United States Patent and Trademark Office*